United States Patent
Fehn et al.

[11] Patent Number: 5,543,181
[45] Date of Patent: Aug. 6, 1996

[54] PROCESS AND DEVICE FOR DEFINED IMPREGNATION OF HONEYCOMB STRUCTURES WITH PARALLEL FLOW CHANNELS

[75] Inventors: Edmund Fehn; Felix Schmidt, both of Rheinfelden; Joerg Plessow, Bad Homburg, all of Germany

[73] Assignee: Degussa Aktiengesellschaft, Frankfurt am Main, Germany

[21] Appl. No.: 357,212

[22] Filed: Dec. 13, 1994

[30] Foreign Application Priority Data

Dec. 16, 1993 [DE] Germany ............................ 43 42 914.9

[51] Int. Cl.⁶ ................................................. B05D 7/00
[52] U.S. Cl. ................... 427/421; 427/236; 427/419.2; 427/419.8
[58] Field of Search ....................... 427/236, 421, 427/419.2, 419.8; 118/313, 317

[56] References Cited

U.S. PATENT DOCUMENTS 4,340,505  7/1982  Dolan ............................ 252/466
4,884,960  12/1989  Chao ............................. 118/317

FOREIGN PATENT DOCUMENTS

| 0568871 | 11/1993 | European Pat. Off. . |
| 0597237 | 5/1994 | European Pat. Off. . |
| 3912915 | 12/1990 | Germany . |
| 689399 | 3/1953 | United Kingdom . |
| 1350697 | 4/1974 | United Kingdom . |

*Primary Examiner*—Shrive Beck
*Assistant Examiner*—David M. Maiorana
*Attorney, Agent, or Firm*—Beveridge, DeGrandi, Weilacher & Young, L.L.P.

[57] ABSTRACT

A process is described for defined impregnation of honeycomb structures and a device for performing the process. The impregnating solutions are sprayed directly into the flow channels in the honeycomb structure using hollow injector needles.

12 Claims, 4 Drawing Sheets

PROCESS AND DEVICE FOR DEFINED IMPREGNATION OF HONEYCOMB STRUCTURES WITH PARALLEL FLOW CHANNELS

INTRODUCTION AND BACKGROUND

The present invention relates to a process for defined impregnation of honeycomb structures with impregnating solutions. The honeycomb structures have flow channels arranged parallel to the main or longitudinal axis of the structure and two cross-sectional surfaces oriented at right angles to the flow channels. The cross-sectional surfaces which form the outer ends in the honeycomb structures may be appropriately shaped for the particular spatial mounting requirements. Circular, square, rectangular and oval cross-sections are most frequently used. Structures that are generally cylindrical are most often used. The flow channels are arranged over the cross-section of the honeycomb structure in a grid which may be designed differently depending on the type of honeycomb structure.

This type of honeycomb structure is used in large numbers in car exhaust gas catalysis. They either consist of correspondingly folded and intertwined metal sheeting or are prepared by extruding ceramic materials. They have between 5 and up to 100 flow channels per $cm^2$, depending on the actual application. The flow channels are arranged parallel to the direction of flow of the waste gases or exhaust gases to be treated for reduction of emissions. As is well known in the art, these honeycomb structures are coated with a layer of finely divided metal oxides with high surface areas which acts as a support for the catalytically active component. Temperature-stabilized γ-aluminum oxide is generally used for the support layer, which may also contain admixed promoters and base metals to modify the catalytic effect. Transition metal oxides are known for this purpose. Coating the honeycomb structures with these high surface area metal oxides can be performed, for instance, by immersing the honeycomb structure in an aqueous suspension of the finely divided high surface area metal oxides. The thickness of layer which is thereby obtained is between about 10 and 130 μm. Refractory metal oxides are well known in the art for this purpose. The process of depositing these metal oxide coatings is known as the "wash coat" process.

The catalytically active elements are usually noble metals such as platinum, palladium and/or rhodium as is well known in the art. They are either added directly to the aqueous suspension of the high surface area metal oxides, in the form of their water-soluble compounds, such as inorganic salts, or they are applied by impregnation after coating the honeycomb structure with the high surface area metal oxides. In this case, the coated honeycomb structures are immersed in the corresponding noble metal inorganic salt solutions.

It is a common feature of both impregnation procedures that the catalytically active components are applied very uniformly over the cross-section of the honeycomb structure. However, it is desirable to be able to apply the catalytically active components to the honeycomb structure with defined concentration gradients transversely to the direction of flow of the exhaust gas. In fact, it is known from DE 39 12 915 C1 that the concentration of catalytically active components at the edges of the honeycomb structure should be higher than in the middle in order to ensure optimal exhaust gas purification while using the smallest possible amount of catalytically active elements.

SUMMARY OF THE INVENTION

It is an object of the present invention to provide a process and to make available a device which allows coated honeycomb structures to be covered with defined concentration gradients of catalytically active components in both the transverse and the longitudinal direction.

The above and other objects are achieved by the process of the invention for defined impregnation of honeycomb structures with impregnating solutions, wherein the honeycomb structure has two cross-sectional surfaces oriented at right-angles to the axis of the structure and flow channels parallel to the gas flow axis of the structure which are arranged in a grid over the cross-section of the honeycomb structure. Although the cylindrical form is a common embodiment of honeycomb, other cross sectional configuration besides circular are contemplated.

A feature of the process of the present invention is that the impregnating solutions are sprayed directly into the flow channels using hollow injector needles. More particularly, the process of the present invention is for defined impregnation of honeycomb structures with impregnating solutions, wherein the honeycomb structure has two cross-sectional surfaces and flow channels parallel to the main axis of the cylinder which are arranged in a grid over the cross-section of the honeycomb structure, and where the impregnating solutions are introduced and sprayed into the flow channels with hollow injector needles.

Thus, the impregnating solutions can be sprayed during insertion of the hollow injector needless into the flow channels as well as during withdrawal of the hollow injector needles from the flow channels, or both.

By using one hollow injector needle for each flow channel of the honeycomb, all of the flow channels can be simultaneously impregnated at any one time. However, less than all channels can be impregnated simultaneously by making a selection of flow channels for simultaneous impregnation at any one time, using one hollow injector needle for each flow channel selected.

In a further variation of the invention, the process can be carried out by spraying the impregnating solutions from the individual hollow injector needles at different rates of spray in order to produce an inhomogeneous impregnation profile over the cross-section of the honeycomb structure.

Alternatively, the impregnating solutions can be supplied to the individual hollow injector needles with different concentrations and/or different compositions in order to produce an inhomogeneous impregnation profile over the cross-section of the honeycomb structure.

It is also possible to carry out the process of the invention by moving the hollow injector needles at speeds which vary with time and/or with rates of spraying of the impregnation solutions in order to produce an inhomogeneous impregnation profile along the flow channels.

A further feature of the present invention is a device to perform the process as described herein.

The device includes (i) a mechanism plate with drilled passageways through the plate and a support plate for the honeycomb structure that is intended to be impregnated with feed holes, which is parallel to that. The drilled passageways and feed holes are arranged so as to correspond to each other and are arranged in the grid of flow channels in the honeycomb structure;

(ii) a plurality of hollow injector needles with a first and a second end, wherein the hollow injector needles are axially sealed at the second end and have spray holes near the end; and (iii) piping for the impregnating solutions to be conveyed to the first end of the hollow injector needles.

The distance between the mechanism plate and the support plate can be altered in order to move the hollow injector needles into the flow channels of the honeycomb structure. The support plate is designed so as to accommodate any desired cross-sectional size and shape of the honeycomb.

BRIEF DESCRIPTION OF THE DRAWINGS

The present invention will be further understood by means of the following drawings; wherein.

DETAILED EMBODIMENT OF THE INVENTION

Figure 1:
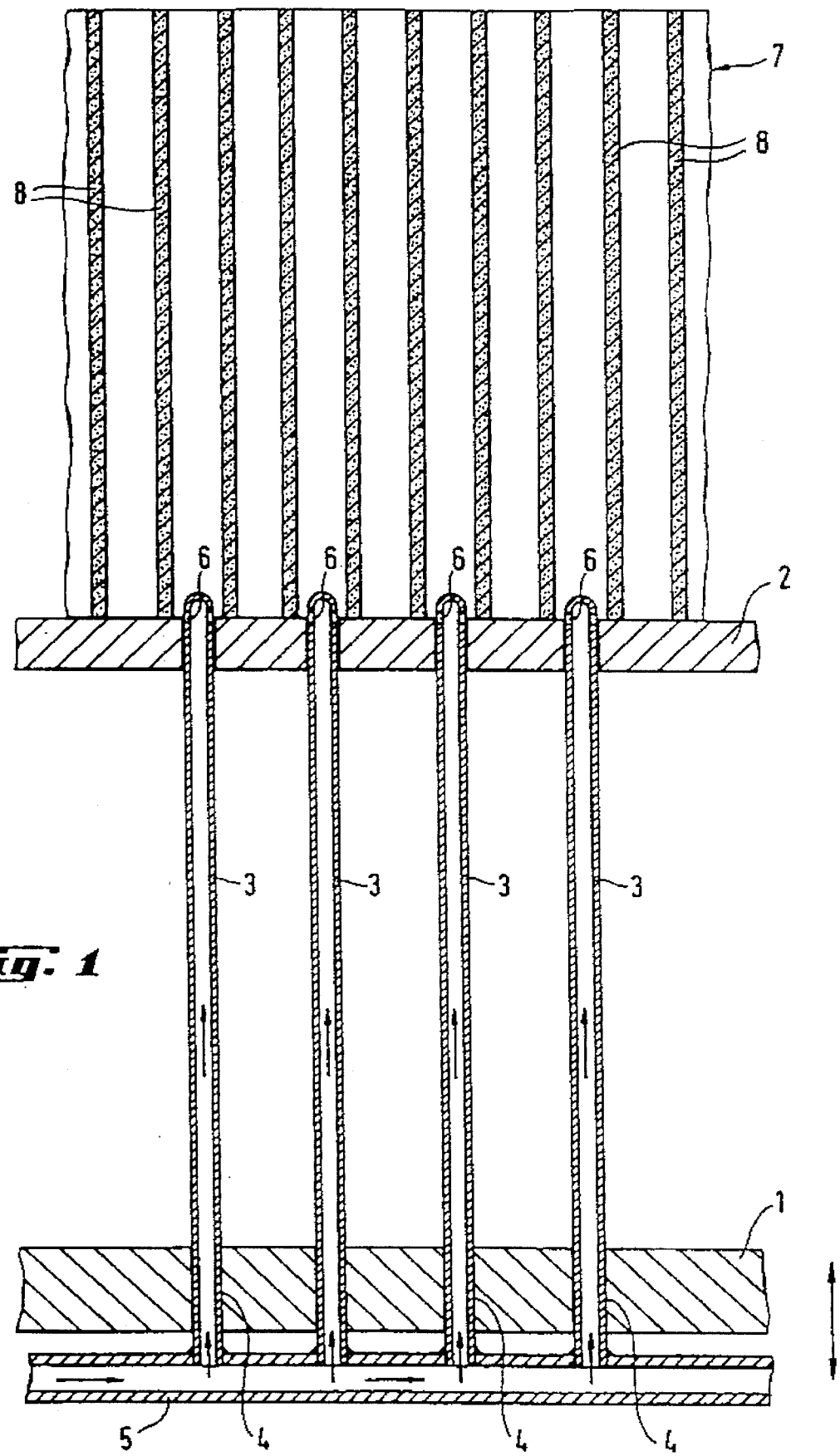
FIG. 1 is a cross-sectional view through the device according to the invention, with maximum spacing between the mechanism plate and support plate, with a honeycomb structure placed on the support plate shortly before the start of the impregnating cycle.

According to the invention, the honeycomb structures are no longer uniformly coated with catalytically active components by immersion into impregnating solutions, but the catalytically active components are sprayed directly into the flow channels using hollow injector needles. In this invention, the hollow injector needles must be at least as long as the length of the flow channels. One end of the hollow injector needles is connected to feed piping for conveying the impregnating solutions from a suitable source, whereas although the other end of the injector needles is sealed in the axial direction, it has radial holes drilled near the end which act as spray holes.

The impregnation solutions can be sprayed during insertion of the hollow injector needles into the flow channels and/or during withdrawal of the hollow injector needles from the flow channels. Impregnation of the flow channels in a honeycomb structure can take place in principle in sequence using one hollow injector needle, it is advantageous, however, to increase productivity by simultaneously impregnating all the flow channels at any one time by using a plurality of hollow injector needles; one for each flow channel. The impregnating solution is an aqueous medium containing noble metal salts and/or soluble compounds of promotors and/or base metals. Examples of noble metal salts are salts of platinum, palladium and/or rhodium.

When impregnating ceramic honeycomb structures, it has been shown that it is not necessary to use a separate hollow injector needle for each flow channel. Due to the porosity of the ceramic honeycomb structure, in fact at any one time at least one adjacent flow channel round about the injection channel is wetted parasitically by diffusion. Thus at least nine adjacent flow channels can be impregnated with one hollow injector needle. It is therefore sufficient to provide only one fresh hollow injector needle for each of the every other neighboring flow channel in a given row of flow channels. This reduces the number of hollow injector needles required to a quarter as compared with the number for complete coverage of every flow channel with one hollow injector needle each. This specific arrangement of hollow injector needles may also be used in order to produce defined concentration gradients of the catalytically active components over the cross-section of a honeycomb structure.

Inhomogeneous impregnation profiles can also be produced in an advantageous manner by providing the hollow injector needles with separate feed piping for the impregnating solution. This makes it possible to feed the impregnating solution to the individual hollow injector needles at different pressures in order in this way to produce a different spraying force and thus different concentration gradients. Furthermore, it is possible, when using this method of working, to apply different impregnating solutions to different regions of the honeycomb structure in one operation. Using the process according to the invention, it is thus possible to produce defined impregnation profiles with respect to the concentration of catalytically active components and also with respect to the composition of the catalytically active components.

The process according to the invention, however, also enables the production of defined impregnation profiles along the flow channels in the honeycomb structure. This takes place in a simple way by altering the speed while moving the hollow injector needles into the flow channels and/or by varying the pressure at which the impregnating solutions are fed to the hollow injector needles. This means that it is possible to position the catalytically active components in the honeycomb structures being impregnated in a completely defined way. This is not possible using the hitherto known processes in the prior art.

The device for performing the process of the invention contains a mechanism plate with drilled passageways and, parallel to this, a support plate for the honeycomb structure being impregnated. The support plate has feed holes which correspond to the passageways drilled in the mechanism plate and are arranged in the grid for the flow channels in the honeycomb structure. The distance between the mechanism plate and the support plate can be altered by an amount which is equal to the length of the flow channels. The first ends of a plurality of hollow injector needles corresponding to the desired impregnation effect are fixed into the drilled passageways in the mechanism plate. The impregnation solutions are fed to the hollow injector needles from the rear of the mechanism plate, this being the face turned away from the support plate. The second ends of the hollow injector needles, which project some distance above the front face of the mechanism plate, are closed or sealed in the axial direction and have a plurality of spray holes near the end. The spray holes proximate the end are oriented radially with respect to the major axis of the needle. The second ends of the hollow injector needles are passed through the feed holes in the support plate.

The length of the hollow injector needles is expediently selected so that the ends project slightly above the support plate when the distance between the mechanism plate and the support plate is adjusted to a maximum, in order in this way to form a location and adjustment facility for the honeycomb structure placed on the support plate.

By reducing the distance between the mechanism plate and the support plate, the hollow injector channels are insertably driven into the flow channels of the honeycomb.

FIG. 1 shows a cross-sectional view through the device according to the invention. Mechanism plate (1) and support plate (2) are shown at their maximum distance apart. The mechanism plate and support plate are connected to the remainder of the apparatus which is not shown and can be of any convenient design.

The ends of the hollow injector needles (3) are fixed in the drilled passageway (4). The hollow injector needles are provided with noble metal solutions via feed piping (5) from the rear of the mechanism plate, this being the face turned away from the support plate. In principle each hollow injector needle or different group of hollow injector needles can be provided with separate piping for impregnating solution. The piping is connected to a source or sources of solutions (not shown). The free ends of the hollow injector needles project beyond the surface of the support plate, just up to the spray holes (6), at the maximum distance between mechanism plate and support plate shown here. The free ends of the hollow injector needles are designed as hemispheres and axially seal the hollow injector needles. The honeycomb structure to be coated (7) is placed on these hemispherical ends of the hollow injector needles and is positioned and adjusted by them so that the needles can conveniently be inserted into the flow channels. The flow channels in the honeycomb structure are formed by the porous walls (8).

Figure 2:
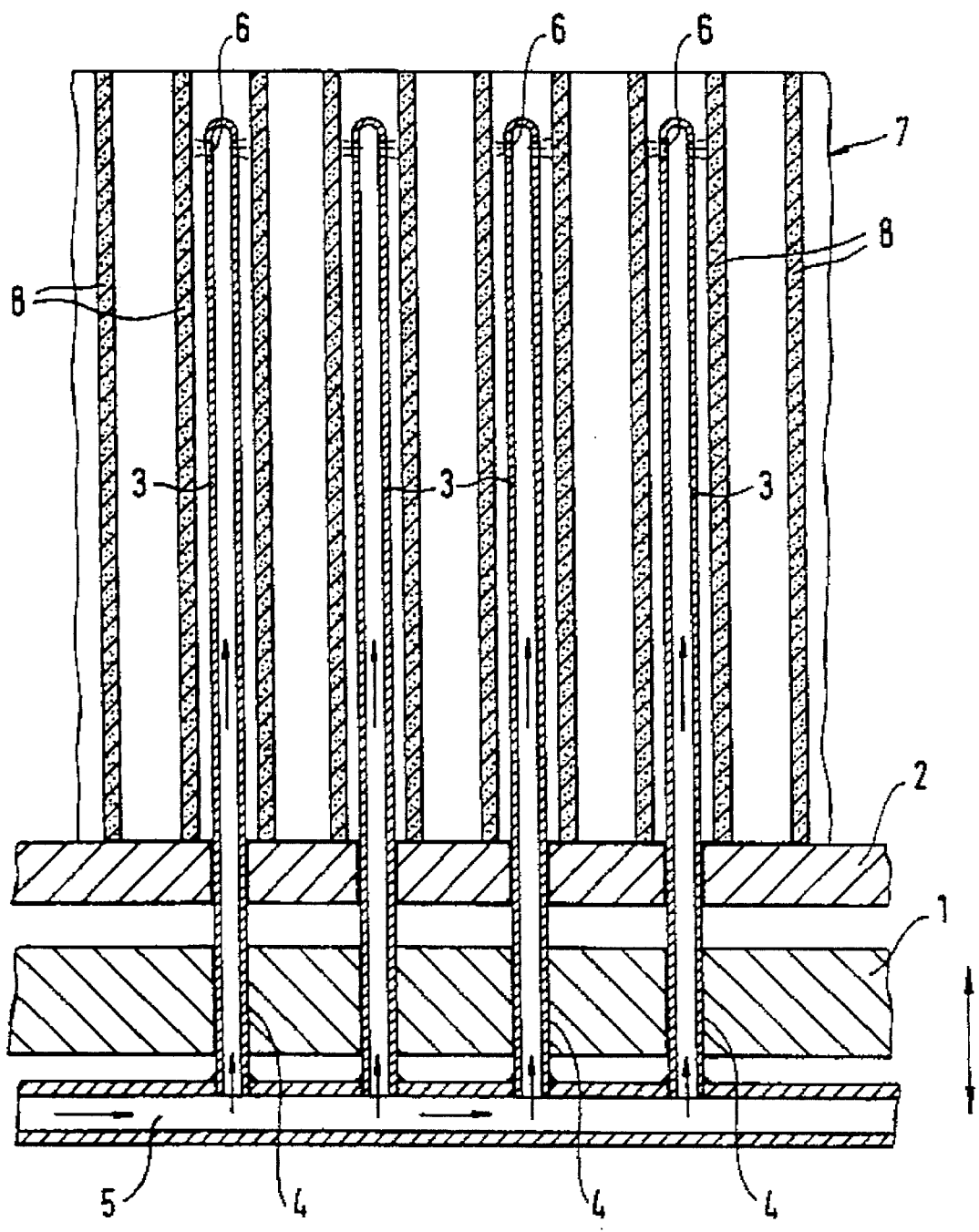
FIG. 2 is a cross-sectional view through the device according to the invention with minimum spacing between the mechanism plate and support plate.

FIG. 2 shows the arrangement for the minimum spacing between mechanism plate and support plate. To impregnate the honeycomb structure, the impregnating solution is pumped into the hollow injector needles and steadily sprayed through the spray holes while simultaneously moving the hollow injector needles inside the flow channels. In the case where the honeycomb is made of porous ceramic, not every flow channel needs to be sprayed and, for example, only every other flow channel need receive an injector needle.

Figure 3:
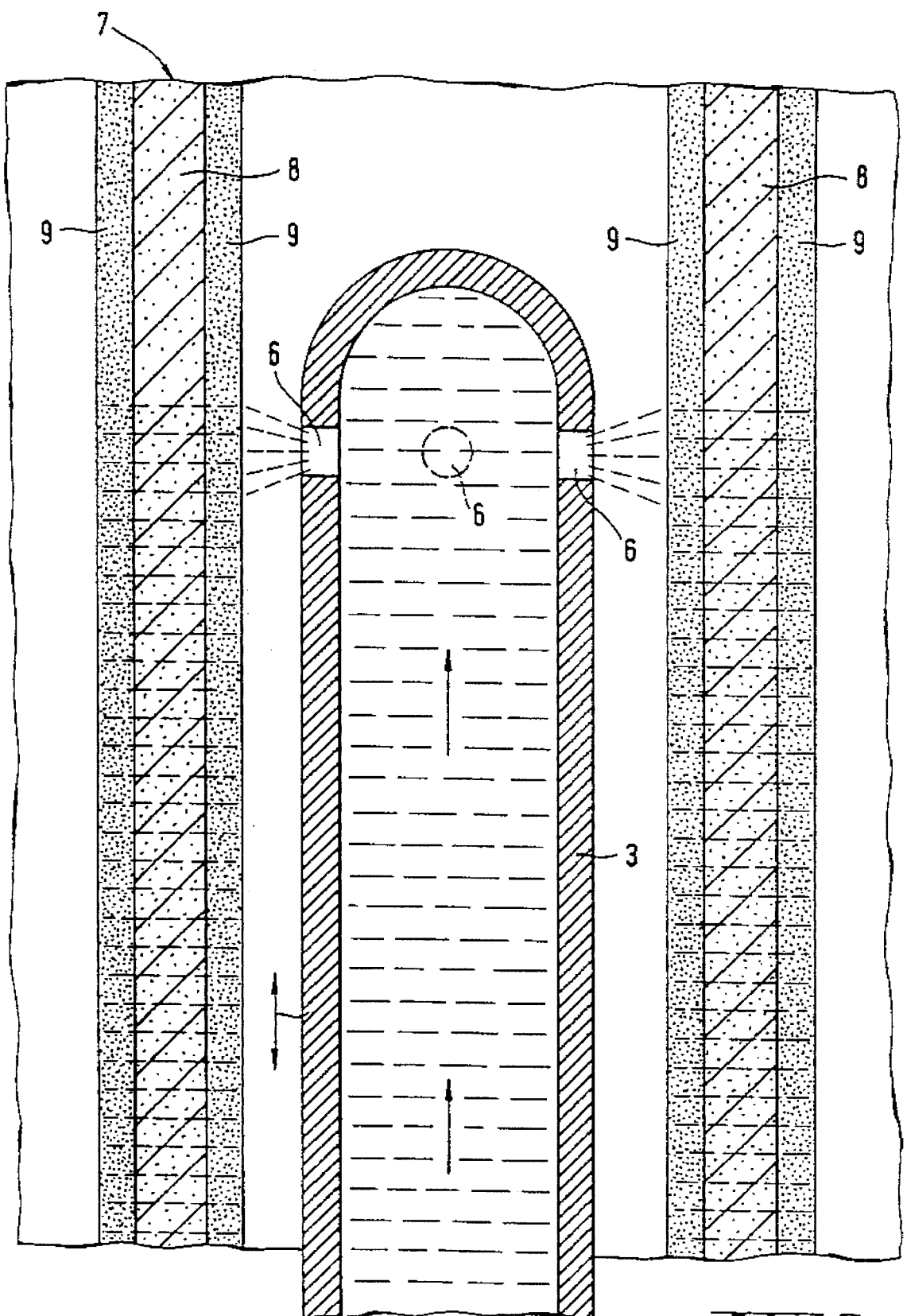
FIG. 3 is an enlarged cross-sectional view of the free end of a hollow injector needle with an axial seal and radial spray holes.

FIG. 3 shows an enlarged diagram of the free end of a hollow injector needle in a flow channel in a ceramic honeycomb structure. The end of the hollow injector needle is advantageously designed to be hemispherical. In this way they can act as a centering and adjustment aid for the honeycomb structure placed on the support plate. The radial spray holes (6) are located just below the hemispherical end of the hollow injector needles. Typically, there are 4 equally spaced spray holes proximate the top end of the needle. The coating (9) of high surface area metal oxide which is to be impregnated with the catalytically active elements by spraying with impregnating solution is located on the ceramic walls (8) of the flow channel. Due to the porosity of the inert ceramic structure, the impregnating solution penetrates the walls (8) and also impregnates the coating (9) in neighboring flow channels.

Figure 4A:
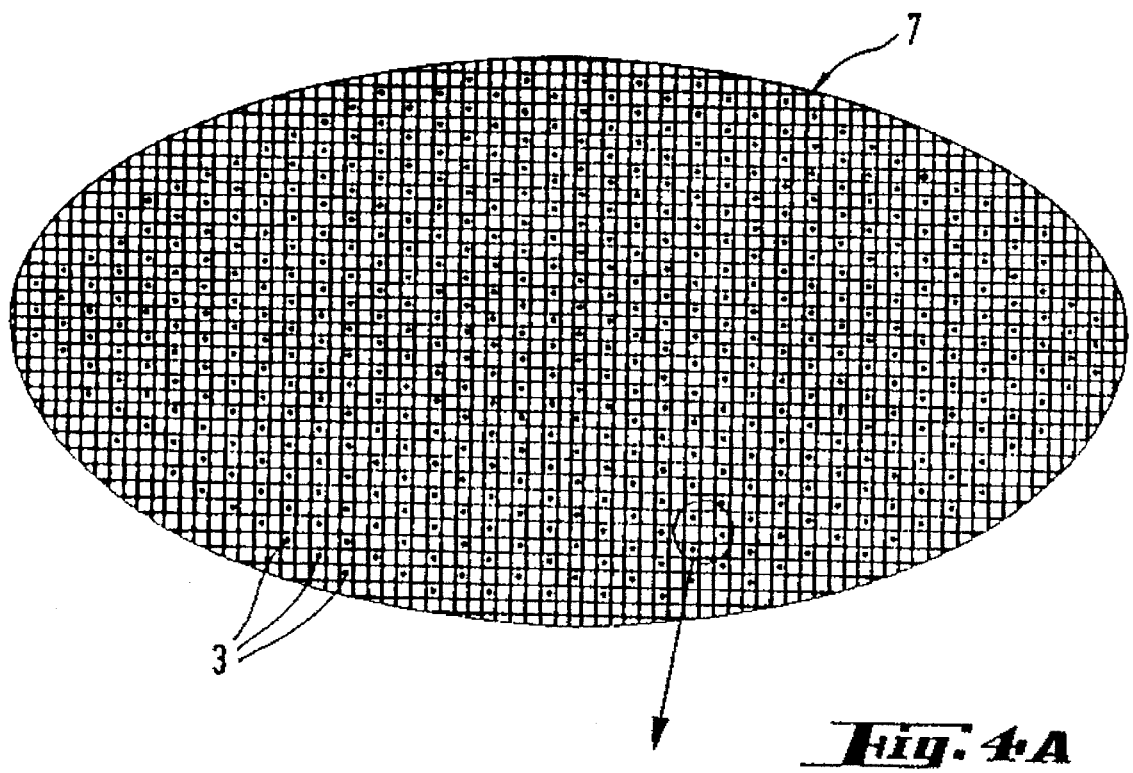
FIG. 4 is an enlarged cross-sectional view of a preferred arrangement of hollow injector needles according to the invention when impregnating a ceramic honeycomb structure.

FIG. 4a shows the cross-section of an oval ceramic honeycomb structure with flow channels arranged in a square grid which is formed by the walls (8).

Figure 4B:
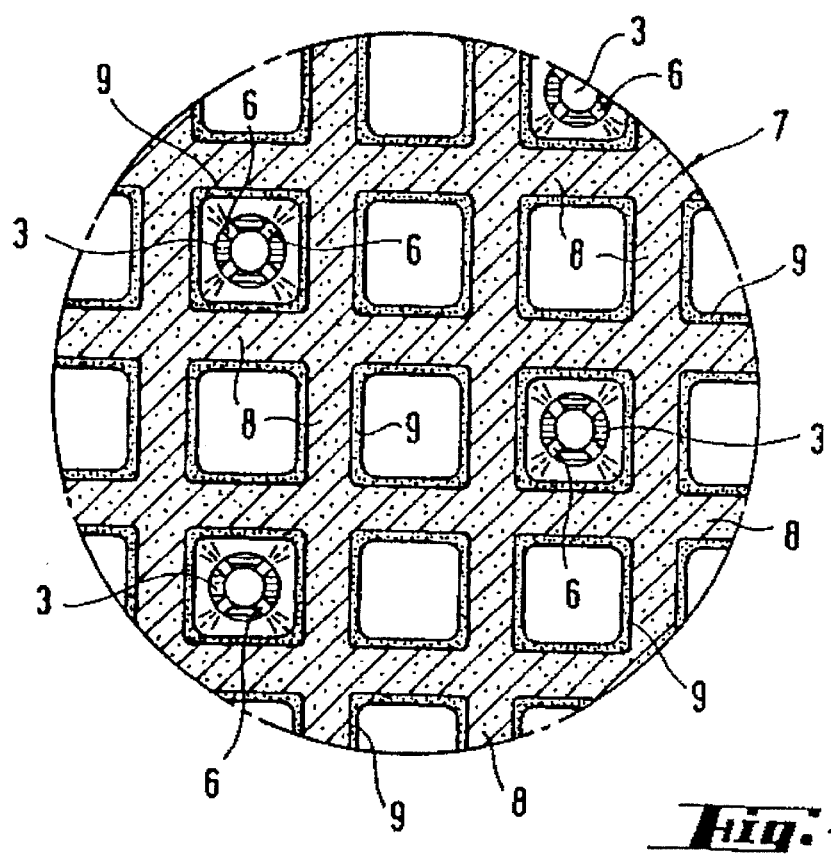

FIG. 4b is a detailed cross sectional view. The internal surfaces of the flow channels are provided with a high surface area metal oxide coating (9) known as a "wash coat" as a support for the catalytically active components to be applied by impregnation. The hollow injector needles (3) are distributed in the pattern of a knight's move in chess over the cross section of the honeycomb structure. The flow channels which are not directly impregnated obtain their impregnation by diffusion from neighboring flow channels. FIGS. 4 and 4b show only one special sample arrangement for the hollow injector needles. Other patterns are also possible.

In FIG. 4b, each channel containing a needle is surrounded by 8 adjacent channels free of a needle.

The solutions of catalytically active substances are usually one or more noble metals and can also include mixtures with other well known dopants.

The compositions of such catalytically active metal containing solutions are all well known and understood in the art.

Further variations and modifications will be apparent to those skilled in the art and are intended to be encompassed by the claims appended hereto.

German priority application P 43 42 914.9 is relied on and incorporated herein by reference.

We claim:

1. A process for the impregnation of a coated honeycomb structure with an impregnating solution in order to achieve a profile of deposited catalytically active components, wherein the honeycomb structure has two cross-sectional surfaces and a plurality of flow channels parallel to the axis of flow which channels are arranged in a grid over the cross-section of the honeycomb structure, said coated honeycomb being previously coated with a layer of finely divided metal oxides, comprising inserting a plurality of hollow injector needles into a plurality of said flow channels and spraying the impregnating solution containing the catalytically active components into the flow channels of the coated honeycomb in sufficient amount to achieve the profile.

2. The process according to claim 1, wherein the impregnating solution is sprayed during insertion of the hollow injector needles into the flow channels and during withdrawal of the hollow injector needles from the flow channels.

3. The process according to claim 1 wherein the impregnating solution is sprayed during insertion of the hollow injector needle into the flow channels or during withdrawal of the hollow injector needles from the flow channels.

4. The process according to claim 2, wherein all the flow channels are simultaneously impregnated at any one time, using one hollow injector needle for each flow channel.

5. The process according to claim 3, wherein all the flow channels are simultaneously impregnated at any one time, using one hollow injector needle for each flow channel.

6. A process according to claim 2, wherein a selection of flow channels is simultaneously impregnated at any one time, using one hollow injector needle for each flow channel selected.

7. A process according to claim 3, wherein a selection of flow channels is simultaneously impregnated at any one time, using one hollow injector needle for each flow channel selected.

8. A process according to claim 1, wherein the impregnating solution is sprayed from the individual hollow injector needles at different rates of spray in order to produce an inhomogeneous impregnation profile over the cross-section of the honeycomb structure.

9. A process according to claim 1, wherein the impregnating solution is supplied to the individual hollow injector needles with different concentrations and/or different compositions in order to produce an inhomogeneous impregnation profile over the cross-section of the honeycomb structure.

10. The process according to claim 1 wherein the hollow injector needles are moved at speeds which vary with time and/or with rates of spraying of the impregnation solutions into the flow channels in order to produce an inhomogeneous impregnation profile along the flow channels.

11. The process according to claim 1 wherein said impregnating solution is an aqueous medium containing noble metal salts and/or soluble compounds of promotors and/or base metals.

12. The process according to claim 11 wherein said noble metal salt is a member selected from the group consisting of platinum, palladium and rhodium.

* * * * *